United States Patent [19]
Hamayasu

[11] 3,840,093
[45] Oct. 8, 1974

[54] BRAKE SHOE SYSTEM FOR BICYCLES
[76] Inventor: Norio Hamayasu, Room No. 402, 3-to, Jigyodan Kido, Syukusha, 131, Kido-cho, Kawachi-Nagano-shi, Osaka Prefecture, Japan
[22] Filed: Jan. 5, 1973
[21] Appl. No.: 321,299

[52] U.S. Cl.............. 188/24, 188/73.1, 188/250 B
[51] Int. Cl............................................. B62l 1/00
[58] Field of Search..... 188/24, 73.1, 250 R, 250 B, 188/250 G

[56] References Cited
UNITED STATES PATENTS
3,732,951  5/1973  Hata .................................... 188/24
FOREIGN PATENTS OR APPLICATIONS
892,521  1/1944  France ........................... 188/250 G
612,141  11/1960  Italy ............................... 188/250 G
488,382  7/1938  Great Britain ................. 188/250 G Primary Examiner—George E. A. Halvosa
Attorney, Agent, or Firm—Toren, McGeady and Stanger

[57] ABSTRACT

The invention relates to a brake shoe system adapted to frictionally contact a bicycle wheel rim so as to brake a running bicycle. The system comprises a brake block fixedly held in a metallic holder. The brake block has a plurality of block members protruding in a line with each other integrally therefrom toward the peripheral surface of the rim, said block members being formed with a pair of oblique sides, a pair of parallel sides extending from both ends of the oblique sides, and a single bridge portion connecting the ends of the parallel sides so as to disperse the braking stress which otherwise may collectively act on said block members thereby securing a good braking effect irrespective of weather conditions.

5 Claims, 7 Drawing Figures

3,840,093

BRAKE SHOE SYSTEM FOR BICYCLES

The present invention relates generally to improvements in a brake shoe system for a bicycle, and more particularly to a rim or caliper brake shoe system provided with brake blocks and metallic shoes or holders which fixedly hold the brake blocks therein and are mounted to brake arms movably in response to the hand operation of a brake lever so as to frictionally contact the system with a bicycle wheel rim thereby effecting the braking operation of a bicycle wheel.

The conventional rim or caliper brake shoe system comprises a pair of metallic shoes or holders connected to brake arms by means of tightening bolts, and brake blocks fixedly secured to the metallic holders and provided with varied shape block members contactably opposing to a bicycle rim portion so as to frictionally brake a running bicycle wheel.

In order to enhance the braking effect of the brake shoe system there have so far been made many attempts to form brake blocks which provide a large braking surface area contactable with a rim portion thereby to increase the pressing force of the brake shoe system against the rim.

However, there still remain such deficiencies that the brake blocks thus formed cannot effectively act especially on rainy days, and that even if they are particularly shaped to drain off rainwater, they cannot avoid being damaged by violent impacts and friction caused in braking operation, thereby limiting their useful life.

In other words, the conventional rim or caliper brake shoe systems are designed to secure a bicycle braking effect for fine days only or to be effective on rainy days, wherein no strength of brake blocks is taken into account.

Accordingly, the present invention has been devised to eliminate all the above-mentioned drawbacks and disadvantages, and has as one of its main objects the provision of a brake shoe system capable of positively braking a running bicycle even if it is exposed to rain so that the rim is covered with water film.

It is another object of the invention to provide a long servable brake shoe system by protecting the friction surface area of the brake block from the damages which otherwise might be caused by the stress violently focussing on the base of the brake block during the course of braking operation.

These and other objects and advantages of the present invention will be apparent from the following description, reference being had to the drawings.

To the above end, generally stated, the invention consists of the novel parts and arrangement hereinafter described and defined in the appended claims.

In the accompanying drawings, which illustrate one embodiment of the invention, like characters and numerals indicate like parts throughout the several views.

Referring to the drawings.

Figure 1:
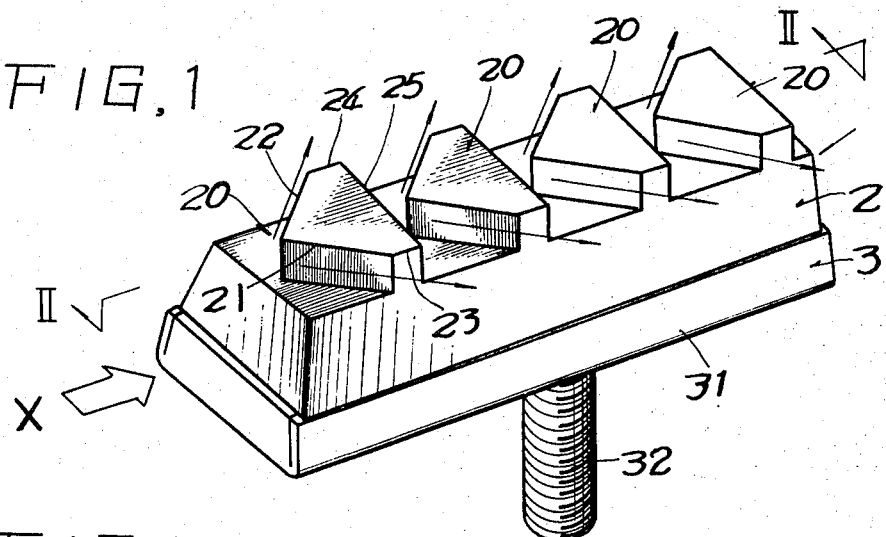
FIG. 1 is a perspective view of a brake block embodied in accordance with the present invention.
Figure 2:
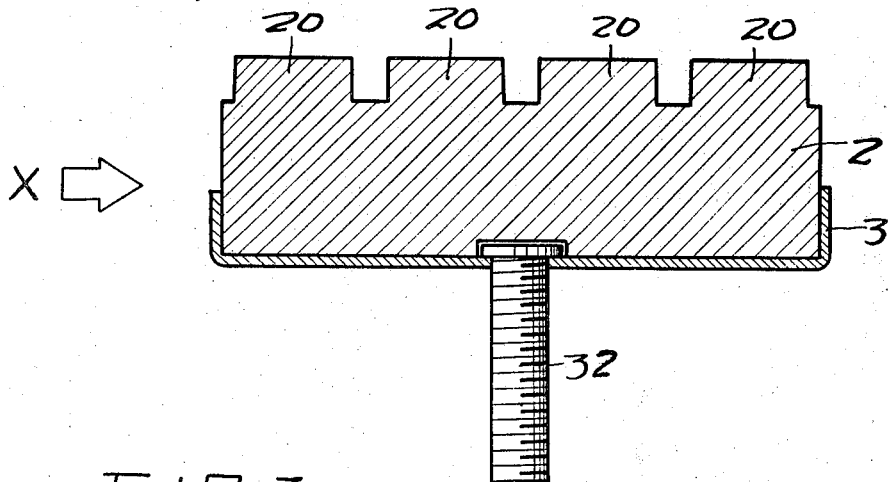
FIG. 2 is a vertical cross-sectioned view taken on the line II — II of FIG. 1.

Referring now to the brake shoe system of the present invention with respect to the drawings, a brake shoe system 1 is mounted on brake arm 11, 12 in a manner that when the brake arm 11, 12 is operated to move inwardly by the hand operation of a brake lever (not shown in the drawings), said system is forcibly brought into contact with a rim portion 14 of a bicycle wheel 13 thereby to halt the rotation of the wheel 13.

The brake shoe system 1 comprises a brake block 2 rigidly held in a metallic brake shoe or holder 3 mounted on said brake arm 11, 12. Said brake block 2 has a plurality of brake block members 20 protruded integrally therefrom toward the periphery of the rim 14 so as to frictionally bring the surface areas of the block members 20 into contact with the rim portion 14.

Said brake block 2 is mainly composed of vulcanized rubber or its mixture with a suitable synthetic fiber and provided with said plurality of block members 20 (as shown in the form of four members with respect to the accompanying drawings) which are formed integrally with the brake block 2 and disposed in a line with each other along the longitudinal direction thereof.

As is clearly evident in FIG. 1, each of said brake block members 20 has a flattened surface area and is formed in a symmetrical configuration defined with a pair of chevron-sectioned portion 21, 22 extending outwardly from the center bisecting the width of the brake block 2 toward an arrow indicated by X to which the bicycle wheel rotates, a pair of parallel linear wall portions 23, 24 extending straight and longitudinally of said brake block 2 from the outermost end of said chevron-sectioned portions 21, 22 in said direction toward which the bicycle wheel rotates, and a single bridge portion 25 which connects the rearward ends of said parallel linear wall portions 23, 24.

Figure 3:
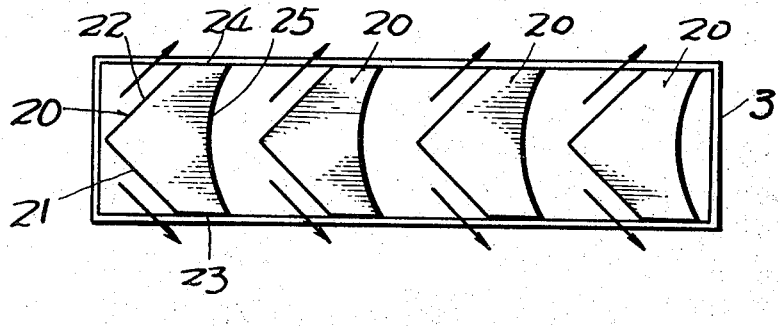
FIG. 3 is a top plan view showing another embodiment of the invention.

Incidentally, said portions 23, 24 are the same in length, and the bridge portion 25 is formed either into a linear line traversing the longitudinal axis of the brake block 2 at a right angle therewith as is shown in FIG. 1 or into a curved line bent forwardly with respect to the rotation of the bicycle wheel 13 as is shown in FIG. 3.

The metallic brake shoe or holder 3 is substantially formed to present a rectangular shallow container-like object made of a metallic plate of suitable dimensions which is bent unidirectionally upright with respect to the plane of the plate so as to provide a rectangular opening formed with four wall members 31 of said object. Through said rectangular opening the brake block 2 is inserted into the brake shoe or holder 3 and fixedly held among the four wall members 31 by forcibly bending the latter inwardly. The base of said object enclosed with said four wall members 31 has a center hole through which a tightening bolt 32 is secured to said object so as to screwably connect the brake shoe or holder 3 to said brake arm 11 or 12.

Figure 7:
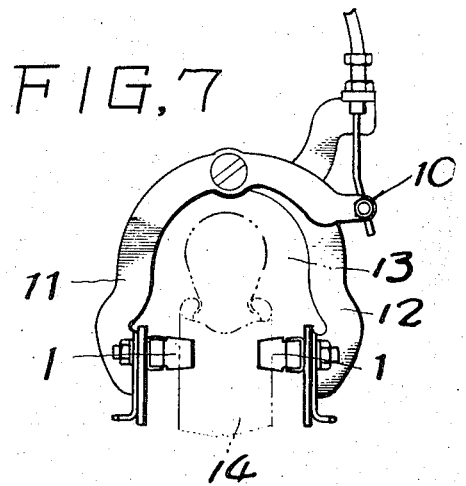
FIG. 7 is a front view showing how the brake shoe systems of the invention are applicable to the conventional caliper brakes.

The above-mentioned brake shoe system 1 of the present invention is rigidly fixed to the brake arm 11, 12 of the caliper brake 10 by means of said tightening bolt 32 as is shown in FIG. 7. When the brake arm 11, 12 is actuated to forcibly bring the brake shoe system 1 into contact with the rim portion 14, the foremost edges of the brake block members 20 are subjected to an abrupt jerking force caused by the initial stress of the rotation of a bicycle wheel. However, due to the particular construction of the block members 20 defined with the chevron-sectioned portions 21, 22 and the parallel linear wall portions 23, 24 connected by the bridge portion 25, said jerking force is not only scraped from the block members 20 rearwardly thereof but also suitably taken over by each block member 20 enclosed with said portions 23, 24 and said bridge 25 so that said foremost edges of the block members 20 can maintain a braking effect in a protracted use without being torn off by such jerking force.

Furthermore, the rim portion 14 is securely controllable under pressure by the above-mentioned block members 20 particularly formed with the chevron-sectioned wall portions 21, 22 so that the great braking effect of the brake shoe system 1 can be obtained at any time irrespective of weather conditions.

To be more precise, if the brake lever is manipulated to bring the brake shoe system 1 into contact with the rim portion 14 while a bicycle is running on a rainy day, the rainwater adhered to the rim portion 14 is moved to the block members 20 and guided along said chevron-sectioned wall portions 21, 22, the result being that the rainwater is finally drained off each block member 20.

Accordingly, there is caused no slip in braking operation between the surface area of each block member 20 and the rim portion 14 when they are both contacted with each other.

Referring to FIG. 3, the bridge portion 25 is formed into a curvature bent opposedly to the direction in which the bicycle wheel 13 rotates so that the rainwater flowing therein is guided outwardly along the curvature; this results in securely enhancing the braking effect of the brake shoe system 1.

Figure 4:
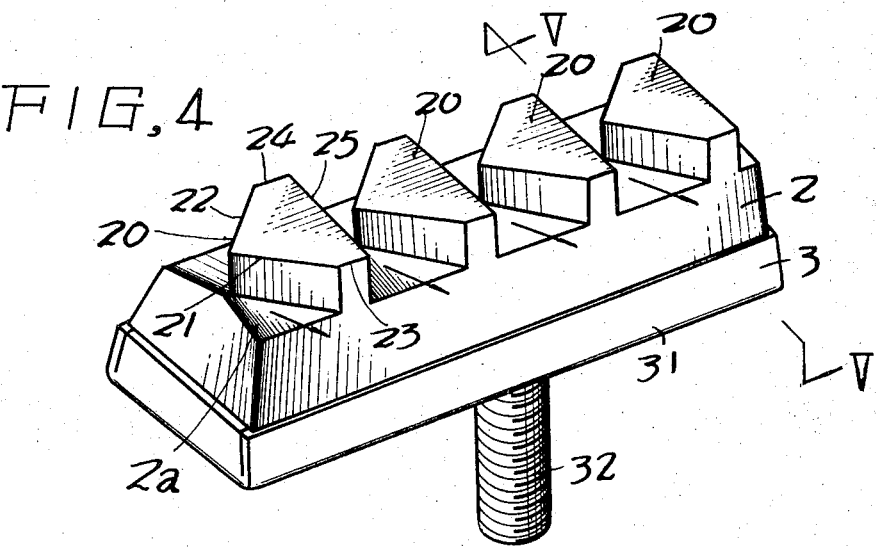
FIG. 4 is a perspective view, similarly to FIG. 1, of a further embodiment of the invention.
Figure 5:
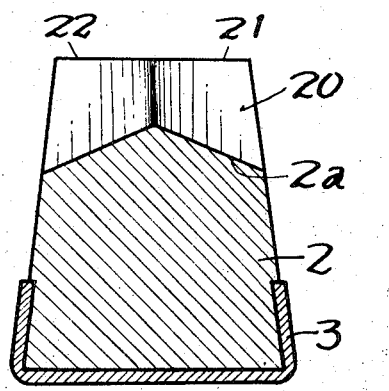
FIG. 5 is a cross-sectioned view taken on the line V — V of FIG. 4.

Beside all the preceding embodiments, it is also possible to modify the brake shoe system 1 of the invention as is illustrated in FIGS. 4 to 5 and described hereinafter with respect thereto.

Namely, in FIGS. 4 and 5 there is shown said brake block 2 having a surface area 2a which is inclined downwardly from the center line extending longitudinally of the brake block 2 so as to form a cone-shaped section with respect to the lengthwise direction of the block 2 as is definitely shown in FIG. 5. The above-mentioned plurality of block members 20 having flattened surface areas are formed in a line with each other on said cone-shaped section surface area 2a in integral relation therewith.

According to this embodiment, such an advantage is provided that even if the rainwater on the rim portion 14 is moved to the brake block 2 by the contact thereof with a bicycle running in the rain, the rainwater never fails to be guided along the aforesaid chevron-sectioned wall portions 21, 22 of the block members 20 until it is completely drained away under the centrifugal force of the rotating bicycle wheel 13 and the initial stress of the wheel that acts on the outer surface areas of said block members 20 against said centrifugal force.

In other words, the brake shoe system 1 disclosed in the preceding embodiment is adapted to guide the water into two dimensional directions along a single plane surface defined by the chevron-sectioned wall portions 21, 22 of each block member 20. However, according to the present embodiment, the system 1 is adapted to guide the water in three dimensional directions along two surfaces defined by said portion 21 or 22, and said cone-shaped section surface area 2a so that the water taken from the rim portion 14 is more effectively drained away from the brake shoe system 1.

Incidentally, the particular block members 20 positioned along the outer edge of the brake block 2 are formed substantially higher in elevation than the rest of the block members 20 so as to provide a levelled friction surface area which can secure the maximum integrated braking effect of each block member 20.

Figure 6:
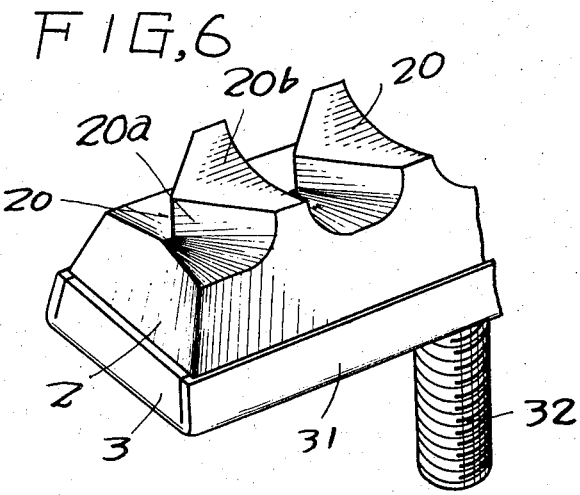
FIG. 6 is a perspective view showing a still further embodiment of the invention wherein some parts thereof are omitted for the purpose of more clarity.

Thus said particular block members are subjected to the abrupt jerking force caused at each time of a braking operation, thus being frictionally damaged. In order to overcome this problem, therefore, the block members 20 are preferably formed so that each wall portion 20a thereof is curved to its aforesaid cone-shaped section surface area 2a from the outer surface area 20b as is clearly shown in FIG. 6 thereby to provide one of the circumferential sections into which a truncated cone is cut in the axial direction thereof.

As has been hereinbefore mentioned, it is to be clearly understood that the brake shoe system of the present invention is long usable to effectively brake a running bicycle wheel irrespective of weather conditions and therefore that a cyclist is always able to maintain a safe braking operation.

While there are herein disclosed but a limited number of embodiments of the structure, process and product of the invention herein presented, it is possible to produce still other embodiments without departing from the inventive concept therein disclosed, and it is desired therefore, that only such limitations be imposed on the appended claims as are stated herein or imposed by the prior art.

What is claimed is:

1. In a brake shoe system for braking a running bicycle wheel by frictionally contacting a rim portion thereof including brake block means, means for fixedly holding said brake block means at a location to effect frictional engagement with said rim portion, a hand brake lever, brake arm means operably connected to said lever and fixture means connecting said holder means to said brake arm to enable manual actuation of said system through said lever, the improvement comprising a plurality of brake block members formed integrally with said brake block means and protruding therefrom in a direction to frictionally engage said rim portion, said brake block means having a longitudinal centerline and a pair of longitudinal outer edges, said block members being positioned in linear alignment relative to each other longitudinally of said brake block means, each of said members being configured with a pair of first upstanding wall portions extending outwardly from the longitudinal center line of said brake block means, said pair of first wall portions consisting essentially of a pair of continuous surfaces intersecting at an apex and extending therefrom along a generally straight path in a diverging configuration rearwardly of the direction of rotation of said bicycle rim portion from said apex continuously to the longitudinal outer edge of said brake block means, a pair of oppositely located parallel wall portions extending integrally from the rearward ends of said first wall portions along the longitudinal outer edges of said brake block means, and a substantially straight single bridge wall portion extending generally perpendicularly across said block member between the rearward ends of said pair of parallel wall portions connecting said rearward ends with one another, said brake block members being so aligned that each of said bridge wall portions is adjacent, but spaced from, an apex of a next adjacent brake block member taken in the longitudinal direction of said brake block means.

2. A system according to claim 1 wherein said single bridge wall portion connecting the rearmost ends of said parallel wall portions is formed as a flat planar wall portion extending transversely across the perpendicular direction of said brake block means.

3. A system according to claim 1, wherein said brake block means includes a surface portion from which said brake block members protrude, said surface portion being formed in an inclined configuration sloping downwardly from the longitudinal center of said brake block means toward the outer edges thereof to form a substantially conically-shaped section.

4. A system according to claim 3, wherein said parallel wall portions are each formed with an identical length.

5. A system according to claim 3, wherein the sides of each of said brake block-members are formed in an inclined configuration sloping downwardly and diverging away from each other taken in a direction from the top surface of said block member closest to said bicycle wheel rim portion toward said surface area of said brake block means from which said brake block members protrude.

* * * * *